United States Patent
Kalyanaraman et al.

(10) Patent No.: US 9,464,915 B1
(45) Date of Patent: *Oct. 11, 2016

(54) ROUTE STABILIZATION SCROLLING MODE

(71) Applicant: International Business Machines Corporation, Armonk, NY (US)

(72) Inventors: Rajesh Kalyanaraman, Bangalore (IN); Senthil K. Venkatesan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/095,663

(22) Filed: Apr. 11, 2016

Related U.S. Application Data (63) Continuation of application No. 14/974,189, filed on Dec. 18, 2015, which is a continuation of application No. 14/673,038, filed on Mar. 30, 2015.

(51) Int. Cl.
*G06F 3/0485* (2013.01)
*G01C 21/36* (2006.01)
*G06F 3/0488* (2013.01)
(Continued)

(52) U.S. Cl.
CPC ......... *G01C 21/367* (2013.01); *G01C 21/3664* (2013.01); *G01C 21/3676* (2013.01); *G06F 3/0482* (2013.01); *G06F 3/0485* (2013.01); *G06F 3/04842* (2013.01); *G06F 3/04883* (2013.01)

(58) Field of Classification Search
CPC ............... G06F 3/0416; G06F 3/0485; G06F 3/04883; G06F 3/04842; G06F 3/0482; G09B 29/106; G01C 21/20; G01C 21/3644; G01C 21/3647; G01C 21/3673; G01C 21/367; G01C 21/3664; G01C 21/3676
See application file for complete search history.

(56) References Cited

U.S. PATENT DOCUMENTS 8,589,818 B1  11/2013  Jones et al.
8,922,592 B2  12/2014  Hirose et al.
(Continued)

FOREIGN PATENT DOCUMENTS

JP  2009074805 A  4/2009

OTHER PUBLICATIONS

Lerin, et al., "A Travel Route Editor on a Focus+Glue+Context Map", Proceedings of the 1st International Workshop on Pervasive Web Mapping, Geoprocessing and Services (WEBMGS 2010), ISPRS, vol. 38, No. 4, 2010.
(Continued)

*Primary Examiner* — Yuen Wong
(74) *Attorney, Agent, or Firm* — Meave M. Carpenter (57) ABSTRACT

An approach for a route stabilization scrolling mode is provided. The approach displays a map window, wherein the map window includes a visible region of a map, the map including a plotted route originating at a source location and ending at a destination location. The approach receives one or more swipe gestures within the map window. The approach determines whether the one or more swipe gestures exceeds an escape velocity threshold. Responsive to a determination that the one or more swipe gestures exceeds the level of intensity to progress the map window into an area of the map away from the plotted route, the approach generates one or more custom pegs, wherein the one or more custom pegs is a compressed snapshot of a last position on the plotted route prior to exceeding the escape velocity threshold.

1 Claim, 5 Drawing Sheets

(51) Int. Cl.
*G06F 3/0484* (2013.01)
*G06F 3/0482* (2013.01)

(56) References Cited

U.S. PATENT DOCUMENTS

| | | | |
|---|---|---|---|
| 2007/0050129 A1* | 3/2007 | Salmre | G01C 21/20 701/408 |
| 2010/0199213 A1 | 8/2010 | Suzuki | |
| 2013/0073203 A1 | 3/2013 | Nesbitt | |
| 2013/0162665 A1 | 6/2013 | Lynch | |
| 2013/0176328 A1 | 7/2013 | Pillai | |
| 2014/0114574 A1 | 4/2014 | Tertoolen et al. | |
| 2014/0129976 A1 | 5/2014 | Beaurepaire et al. | |

OTHER PUBLICATIONS

U.S. Appl. No. 14/673,038, filed Mar. 30, 2015.
List of IBM Patents or Patent Applications Treated as Related (Appendix P), filed herewith.
U.S. Appl. No. 14/974,189, filed Dec. 18, 2015.

* cited by examiner

ROUTE STABILIZATION SCROLLING MODE

BACKGROUND OF THE INVENTION

The present invention relates generally to route navigation systems on mobile devices, and more particularly to a route stabilization scrolling feature for route navigation systems.

Conventional route navigation systems provide a route (i.e., a plotted route between an originating point and a destination point) on a map. These route navigation systems allow a user to navigate through the route in a step by step fashion by system generated pegs, the discrete steps defined by the system to provide logical milestones along the route. These route navigation systems provide a user with a partial view (i.e., visible region) of the route depending on various constraints such as screen size and zoom level of the map, allowing the user to scroll through the map for areas around the route in varying proximities to the route. Typically, users can return to the route by clicking a "return to route" icon provided in a user interface.

SUMMARY

Aspects of an embodiment of the present invention disclose a method, a computer system, and a computer program product for a route stabilization scrolling mode for use with a computing device by a user for scrolling through a map and utilizing scroll elasticity to allow viewing of areas of a map off route with an automatic return to one or more previous positions along a plotted route in a map window, in accordance with an embodiment of the present invention. In one aspect, a computer program product includes one or more computer readable storage devices, wherein the one or more computer readable storage device are not a transitory signal per se, and program instructions stored on the one or more computer readable storage devices execute a method that includes displaying, by one or more computer processors, a map window, wherein the map window includes a visible region of a map, the map including a plotted route originating at a source location and ending at a destination location. The method includes receiving, by one or more computer processors, one or more swipe gestures within the map window, wherein the one or more swipe gestures progress the visible region within the map window along the plotted route on the map. The method includes determining, by one or more computer processors, whether the one or more swipe gestures exceeds an escape velocity threshold, wherein the escape velocity threshold is a level of swipe intensity sufficient to progress the map window into an area of the map away from the plotted route. Responsive to a determination that the one or more swipe gestures exceeds the level of intensity to progress the map window into an area of the map away from the plotted route, the method includes generating, by one or more computer processors, one or more custom pegs, wherein the one or more custom pegs is a compressed snapshot of a last position on the plotted route prior to exceeding the escape velocity threshold, and wherein generating one or more custom pegs includes capturing a snapshot of a last position on the plotted route visible in the map window prior to exceeding the escape velocity threshold, and preserving the one or more custom pegs as a border in the map window. The method includes receiving a custom peg selection, wherein the custom peg selection includes a swipe gesture indicating a selection of a custom peg from a border of the map window, and returning the map window to a last position on the plotted route visible in the map window prior to exceeding the escape velocity threshold.

DETAILED DESCRIPTION

Embodiments of the present invention recognize that when a user scrolls on a map area on a mobile device while seeing a route, the route usually goes out of the visible region and the user finds it hard to bring the route back into the map window. Embodiments of the present invention further recognize that a user might find interesting areas near the route that are between peg points provided by the route navigation system. This context is lost if a "follow the route" mode is used.

Embodiments of the present invention provide the capability to guarantee a user will not lose focus of a route when scrolling through a map, such that whenever a user scrolls up and down within a map window, the map window progresses along a route in a forward and reverse direction respectively. Embodiments of the present invention further provide for a configurable map window orientation, such that as a user progresses along a route, the map window can be oriented such that North is at the top or bottom of the map window, or a destination is at the top or bottom of the map window. Embodiments of the present invention further provide the capability to generate custom pegs that allow a user to return to a position on the route just prior to leaving the route, where the custom pegs remain in the visible area of the map regardless of where the route is. Embodiments of the present invention provide the capability to scroll through a map utilizing scroll elasticity, where scroll elasticity allows temporary exploration of areas of a map off route with an automatic return of the route in the visible area of the map.

Implementation of such embodiments may take a variety of forms, and exemplary implementation details are discussed subsequently with reference to the Figures.

Figure 1:
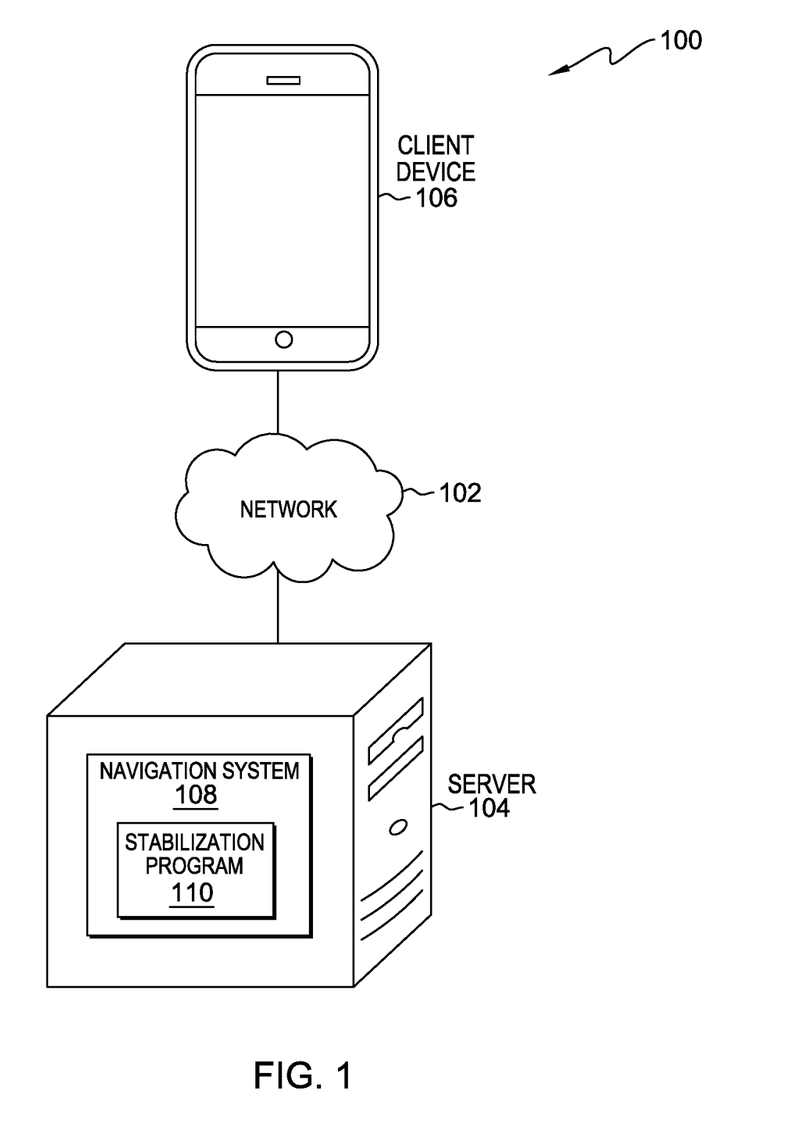
FIG. 1 is a functional block diagram illustrating a data processing environment, generally designated 100, in accordance with an embodiment of the present invention.

The present invention will now be described in detail with reference to the Figures. FIG. 1 is a functional block diagram illustrating a data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. FIG. 1 includes network 102, server 104, and a client device 106.

In the exemplary embodiment, network 102 is the Internet representing a worldwide collection of networks and gateways that use TCP/IP protocols to communicate with one another. Network 102 may include wire cables, wireless communication links, fiber optic cables, routers, switches and/or firewalls. Server 104 and client device 106 are interconnected by network 102. Network 102 can be any combination of connections and protocols capable of supporting communications between server 104, client device 106, and navigation system 108. Network 102 may also be implemented as a number of different types of networks, such as an intranet, a local area network (LAN), a virtual local area network (VLAN), or a wide area network (WAN). FIG. 1 is intended as an example and not as an architectural limitation for the different embodiments.

In the exemplary embodiment, server 104 may be, for example, a server computer system such as a management server, a web server, or any other electronic device or computing system capable of sending and receiving data. In another embodiment, server 104 may be a data center, consisting of a collection of networks and servers providing an IT service, such as virtual servers and applications deployed on virtual servers, to an external party. In another embodiment, server 104 represents a "cloud" of computers interconnected by one or more networks, where server 104 is a computing system utilizing clustered computers and components to act as a single pool of seamless resources when accessed through network 102. This is a common implementation for data centers in addition to cloud computing applications. In the exemplary embodiment, server 104 includes a navigation system 108 for route navigation on a mobile device, such as client device 106.

In the exemplary embodiment, navigation system 108 operates on a central server, such as server 104, and can be utilized by one or more client devices, such as client device 106 via a mobile application download from the central server or a third-party application store, and executed on the one or more client devices. In another embodiment, navigation system 108 may be a software-based program, downloaded from a central server, such as server 104, and installed on one or more client devices, such as client device 106. In yet another embodiment, navigation system 108 may be utilized as a software service provided by a third-party cloud service provider (not shown).

In the exemplary embodiment, navigation system 108 is a conventional route navigation system typically utilized by a mobile device, such as client device 106, for route navigation between two or more locations. In the exemplary embodiment, navigation system 108 provides the capability to plot a route between two or more points on a map. In the exemplary embodiment, navigation system 108 provides a visual area of a portion of the map, where the visual area can include the route along the map, as well as areas of the map off-route. In the exemplary embodiment, navigation system 108 allows a user to scroll in any direction (i.e., up, down, left, right, diagonally, etc.) along the map, the route plotted on the map, and areas of the map off-route, using a plurality of gestures (e.g., swipe up, swipe down, swipe left, swipe right, zoom in, zoom out, pinching, tapping, etc.) on a user interface (not shown). In the exemplary embodiment, navigation system 108 utilizes location services (i.e., global position systems) to identify a location of a user's mobile device, such as client device 106, on a map, and monitor the location of the user's mobile device on the map as that location changes. In the exemplary embodiment, navigation system 108 includes stabilization program 110 for providing a route stabilization mode feature for enhanced scrolling along a route plotted on a map.

In the exemplary embodiment, stabilization program 110 is a software-based program capable of providing a route stabilization scrolling mode feature for a route navigation system, such as navigation system 108. In the exemplary embodiment, stabilization program 110 is an add-on feature for a route navigation system that enables a user to retain focus on a route when scrolling through a map. In the exemplary embodiment, stabilization program 110 utilizes a plurality of swipe gestures received from a user via a user interface (not shown) to interpret the user's intentions for progressing a visual area (i.e., a map window) along a route on a map. Stabilization program 110 moves the map window in the direction of the route (e.g., point A to point B) with a distance computed based on an intensity of a swipe gesture. In the exemplary embodiment, stabilization program 110 provides a user with scroll elasticity, where scroll elasticity is a level of swipe gesture intensity needed to scroll away from a route, such as whenever there is an attempt to scroll the map window in a direction where the route is liable to be pushed out of the visible region. In the exemplary embodiment, stabilization program 110 provides a compressed snapshot of a previous map window captured as a thin border in the new map window, where the compressed snapshot includes a section of the route last viewed. In the exemplary embodiment, stabilization program 110 provides a custom peg feature that indicates to a user that the visual area has left the route, and allows the user to return to the same position on the route when selected. In the exemplary embodiment, stabilization program 110 is fully integrated with navigation system 108. In some embodiments, stabilization program 110 may be partially integrated or separate from a route navigation system, such as navigation system 108. In one embodiment, stabilization program 110 may be a mobile application, downloaded from an application store or third party provider, capable of being used in conjunction with an existing route navigation system on a mobile device, such as client device 106.

In the exemplary embodiment, client device 106 is a client to server 104 and may be, for example, a desktop computer, a laptop computer, a tablet computer, a personal digital assistant (PDA), a smart phone, a thin client, or any other electronic device or computing system capable of communicating with server 104 through network 102. For example, client device 106 may be a mobile device capable of connecting to a network, such as network 102, to conduct access the Internet, utilize location services, and utilize a navigation system, such as navigation system 108. In one embodiment, client device 106 may be any suitable type of mobile device capable of running mobile applications, including a smart phone, tablet, slate, or any type of device that runs a mobile operating system. In one embodiment, client device 106 includes a user interface (not shown) for providing an end user with the capability to interact with a navigation system, such as navigation system 108 and a stabilization program, such as stabilization program 110. A user interface refers to the information (such as graphic, text, and sound) a program presents to a user and the control sequences the user employs to control the program. There are many types of user interfaces. In one embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computer, GUIs were introduced in reaction to the perceived steep learning curve of command-line interfaces, which required commands to be typed on the keyboard. The actions in GUIs are often performed through direct manipulation of the graphics elements.

In one embodiment, client device 106 includes a display screen on which a map can be viewed in conjunction with navigation system 108 and stabilization program 110. For example, client device 106 may include a user interface that provides an end user with the capability to interact with a navigation system, such as navigation system 108, using a plurality of swipe gestures to progress a visible area of a map along a route viewed on a display screen.

In an alternate embodiment, client device 106 may be any wearable electronic device, including wearable electronic devices affixed to eyeglasses and sunglasses, helmets, wristwatches, clothing, wigs, and the like, capable of sending, receiving, and processing data. For example, client device 106 may be a wearable electronic device, such as a wristwatch, capable of executing an application and utilizing location services in conjunction with a navigation system to monitor a user's location on a map.

Figure 2:
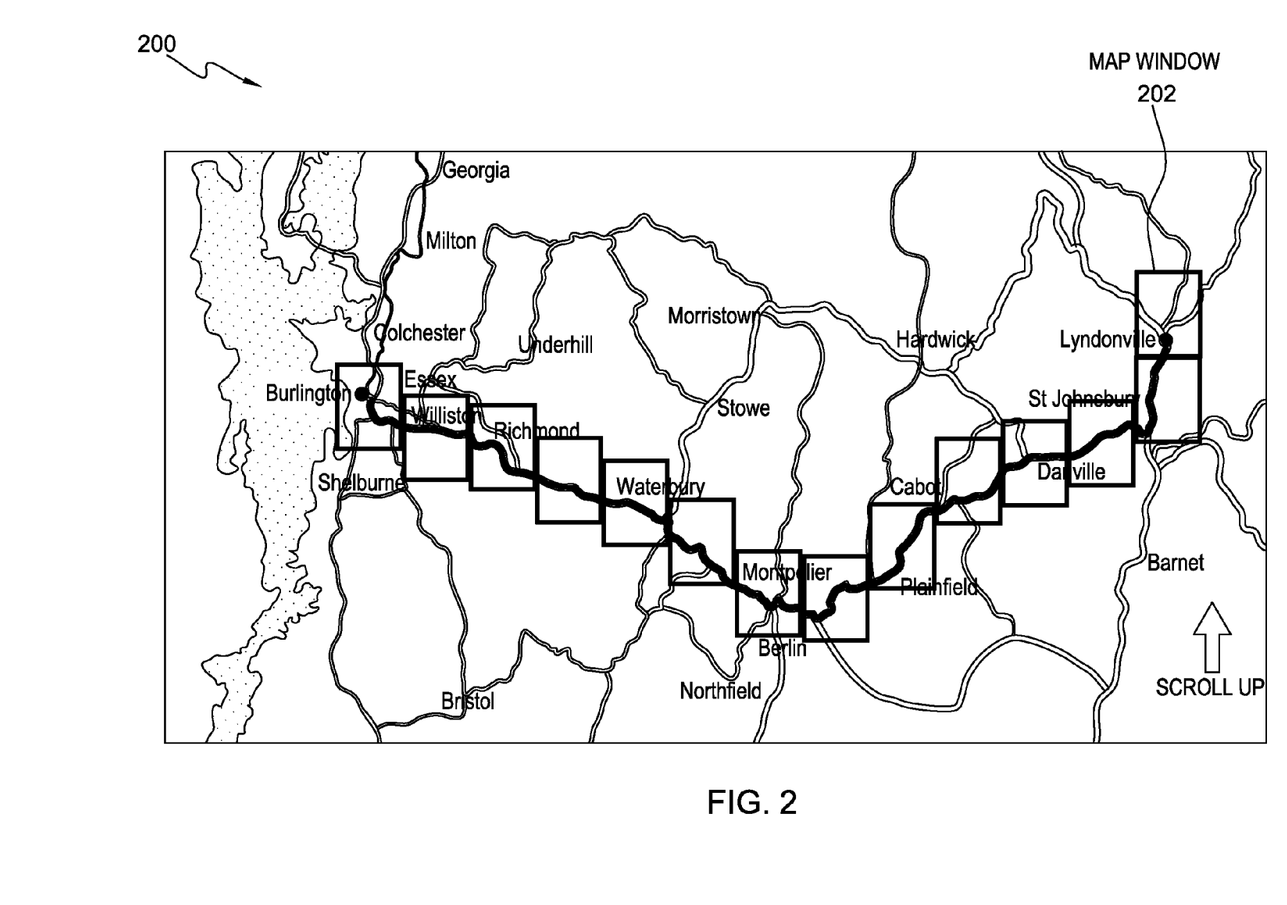
FIG. 2 is a screenshot of a display screen of a mobile device, such as the client device of FIG. 1, generally designated 200, depicting a route stabilization scrolling mode feature of the stabilization program discussed in further detail in FIG. 4, in accordance with an embodiment of the present invention.

FIG. 2 is a screenshot of a display screen of a mobile device, such as client device 106, generally designated 200, depicting a route stabilization scrolling mode feature of stabilization program 110, discussed in further detail in FIG. 4, in accordance with an embodiment of the present invention.

Responsive to receiving a plurality of swipe gestures, stabilization program 110 progresses a map window, such as map window 202, along a route in a direction corresponding to a swipe gesture without skipping to a next logical milestone. Stabilization program 110 retains focus of map window 202 on the route, progressing a pointer towards a destination based, at least in part, on a level of intensity associated with an up swipe gesture (i.e., distance traveled by the pointer is proportional to the intensity of the up swipe gesture, such that a more intense up swipe gesture progresses the pointer further and faster along the route towards the destination than a less intense up swipe gesture).

In the exemplary embodiment, stabilization program 110 displays map window 202 with a map orientation, where the map orientation locates a north direction at a top of map window 202 and a south direction at a bottom of map window 202. In another embodiment, stabilization program 110 may display map window 202 with a route orientation, where the route orientation locates a destination direction at a top of map window 202 and a source location direction at a bottom of map window 202. In one embodiment, stabilization program 110 displays map window 202 (i.e., visible region) with a static visual orientation (e.g., north/south). For example, stabilization program 110 may display map window 202 sharing the same orientation as the map, where the top and bottom of map window 202 is oriented north and south, respectively. In another embodiment, stabilization program 110 may display map window 202 as a configurable map window with a dynamic visual orientation, where the dynamic visual orientation of map window 202 changes with the route. For example, when the direction of the route changes (e.g., from north to east, then from east to south), stabilization program 110 changes the orientation of map window 202, such that the orientation of map window 202 matches the direction of forward progression along the route. In yet another embodiment, stabilization program 110 may display map window 202 as a configurable map window where the top of map window 202 is oriented towards a destination and the bottom of map window 202 is oriented towards a source location (i.e., origin).

Stabilization program 110 progresses map window 202 into an area of the map where the route is missing when an escape velocity threshold is exceeded, where the escape velocity threshold is a level of swipe gesture intensity that overcomes the elastic behavior of the map window when scrolled off route. In one embodiment, the escape velocity threshold may be user configurable to customize how intense of a swipe gesture is needed in order to overcome the elastic behavior of the map window. For example, a user may configure the escape velocity threshold high, such that only those swipe gestures indicating a level of intensity to overcome the elastic behavior of the map window, such as high velocity (i.e., swipe speed), heavy force (i.e. swipe pressure), etc., overcome the escape velocity threshold, thereby overcoming the elastic behavior the of map window and allowing the map window to remain in an area of the map off route. In response to receiving a swipe gesture with a level of intensity to overcome the escape velocity threshold, resulting in the map window being directed into an area of the map off route, stabilization program 110 generates a custom peg of the last position on the route visible in the map window prior to exceeding the escape velocity threshold. Generation of custom pegs is described in further detail in FIG. 3.

Figure 3:
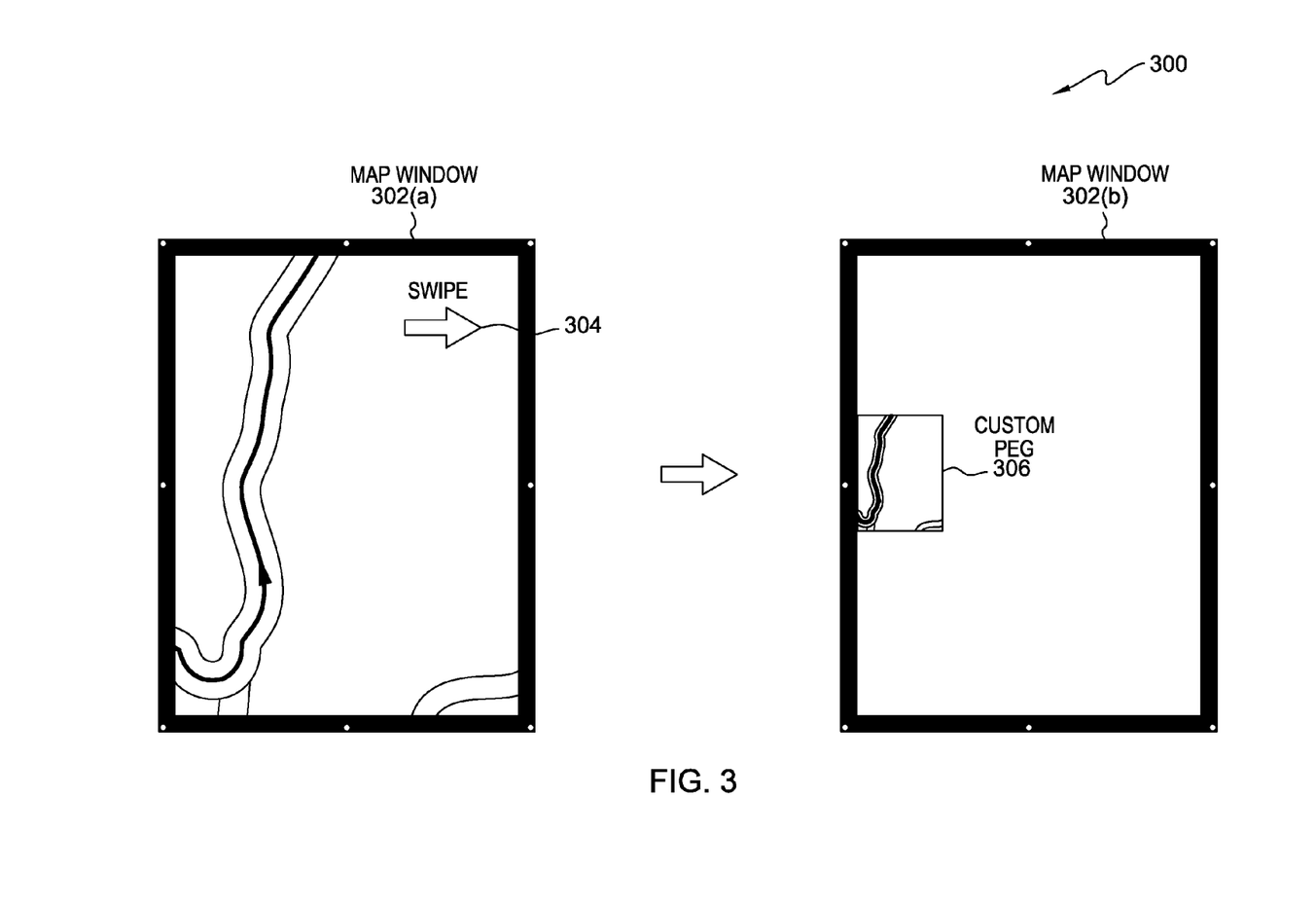
FIG. 3 is a screenshot of a display of a mobile device, such as the client device of FIG. 1, generally designated 300, depicting a route stabilization scrolling mode feature of the stabilization program discussed in further detail in FIG. 4, in accordance with an embodiment of the present invention.

FIG. 3 is a screenshot of a display of a mobile device, such client device 106, generally designated 300, depicting a route stabilization scrolling mode feature of stabilization program 110, discussed in further detail in FIG. 4, in accordance with an embodiment of the present invention.

In response to receiving a directional swipe gesture exceeding the escape velocity threshold, such as swipe 304 in a map window 302(*a*), enabling the map window to remain in an area on the map off route, stabilization program 110 captures a snapshot of the last position on the route visible in the map window prior to exceeding the escape velocity threshold. In the exemplary embodiment, the snapshot is preserved in the map window as custom peg, such as custom peg 306 in map window 302(*b*). Custom peg 306 remains visible as a thin border within the visible area of the map whenever the route is lost from the visible region. Stabilization program 110 preserves custom peg 306 in the border of the map window, thereby allowing the user to continue scrolling around areas of the map around the route without losing the last visible section of the route. In the exemplary embodiment, custom peg 306 serves as a guidepost marking a position on the map with the route visible. Custom peg 306 indicates to a user the location of the section of the route last viewed prior to exceeding the escape velocity, such that when the user swipes in the direction of the custom peg, the map window is progressed in a direction leading back to the route.

In the exemplary embodiment, stabilization program 110 preserves custom peg 306 as a border in the map window (e.g., left, right, top, bottom, corner, etc.) while a user scrolls in any direction on the map. Whenever a route is missed in any direction, stabilization program 110 generates a custom peg, such as custom peg 306, within the map window. For example, when a user hovers over a custom peg, a map snapshot (along with a route) is shown with a swipe animation, and the current snapshot gets pushed as a border to an opposite corner of the map window.

In the exemplary embodiment, custom peg 306 allows the user to immediately return to the same position on the route, regardless of the current location of the map window. For example, where the user selects a custom peg (i.e., a custom peg selection) by tapping within the thin border or within the custom peg, stabilization program 110 immediately returns the visual area (i.e., map window) to the last position on the route visible in the map window prior to exceeding the escape velocity threshold.

Figure 4:
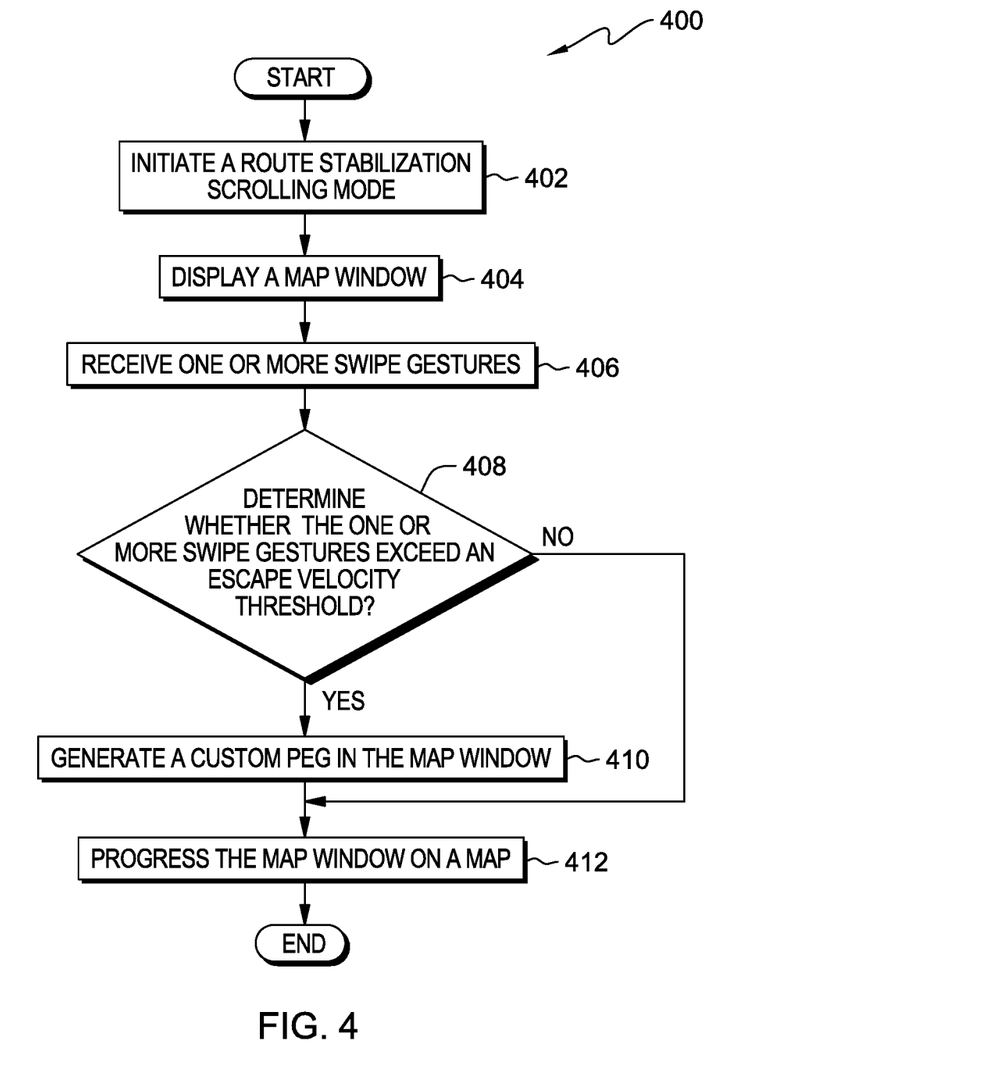
FIG. 4 is a flowchart depicting operational steps of a stabilization program, such as the stabilization program of FIG. 1, generally designated 400, for a route stabilization scrolling mode, in accordance with an embodiment of the present invention.

FIG. 4 is a flowchart of the steps of a stabilization program, such as stabilization program 110, generally designated 400, for providing a route stabilization scrolling mode, in accordance with an embodiment of the present invention.

Stabilization program 110 initiates a route stabilization scrolling mode (402). In the exemplary embodiment, responsive to a user electing to use a route stabilization scrolling mode within a route navigation system, such as navigation system 108, stabilization program 110 initiates the route stabilization scrolling mode by switching from a default scrolling mode to the route stabilization scrolling mode. For example, a user may elect to use a route stabilization scrolling mode by selecting an icon, such as "route stabilization mode" on a user interface for a route navigation system, such as navigation system 108.

Stabilization program 110 displays a map window (404). In the exemplary embodiment, stabilization program 110 displays a map window with a map orientation, where the map orientation locates a north direction at a top of the map window and a south direction at a bottom of the map window. In another embodiment, stabilization program 110 displays a map window with a route orientation, where the route orientation locates a destination direction at a top of the map window and a source location direction at a bottom of the map window. In one embodiment, stabilization program 110 displays the map window (i.e., visible region) with a static visual orientation (e.g., north/south). For example, stabilization program 110 may display a map window sharing the same orientation as the map, where the top and bottom of the map window is oriented north and south, respectively. In another embodiment, stabilization program 110 may display a configurable map window with a dynamic visual orientation, where the dynamic visual orientation of the map window changes with the route. For example, when the direction of the route changes (e.g., from north to east, then from east to south), stabilization program 110 changes the orientation of the map window, such that the orientation of the map window matches the direction of forward progression along the route. In yet another embodiment, stabilization program 110 may display a configurable map window where the top of the map window is oriented towards a destination and the bottom of the map window is oriented towards a source location (i.e., origin).

Stabilization program 110 receives one or more swipe gestures (406). In the exemplary embodiment, stabilization program 110 receives one or more swipe gestures within the map window, where the one or more swipe gestures can include an up swipe gesture, a down swipe gesture, and a directional swipe gesture (e.g., left, right, and diagonal). In the exemplary embodiment, stabilization program 110 utilizes up swipe gestures and down swipe gestures to navigate a map window along a route without losing the route from the visible region. For example, a user wants to go from source A to destination B via a route plotted on a map. In response to receiving an up swipe gesture, stabilization program 110 progresses a map window in a forward direction of the route (i.e., a pointer on the route is moved towards the destination, and the next section of the route enters into the map window). In response to receiving a down swipe gesture, stabilization program 110 progresses the map window in a reverse direction of the route (i.e., a pointer on the route is moved towards the source, and the previous section of the route returns to the map window). In response to receiving a directional swipe gesture (e.g., left, right, diagonal, northeast, northwest, southeast, southwest, etc.), stabilization program 110 scrolls the map window accordingly in that direction to view a nearby area relative to the route. In the exemplary embodiment, stabilization program 110 prevents a user from losing focus on the route by scrolling the map window off route elastically whenever a swipe gesture indicates progression of the map window away from the route. For example, where stabilization program 110 receives a left swipe gesture, stabilization program 110 temporarily (i.e., elastically) progresses the map window in a left direction, holding a fixed focus point on the route, such that when the user releases the left swipe gesture, the map window returns to the fixed focus point on the route.

Stabilization program 110 determines whether the one or more swipe gestures exceed an escape velocity threshold (408). In the exemplary embodiment, stabilization program 110 determines whether one or more swipe gestures exceed an escape velocity threshold based on a level of intensity associated with the one or more swipe gestures. In the exemplary embodiment, stabilization program 110 determines the one or more swipe gestures exceeds the escape velocity threshold where the one or more swipe gestures indicate a level of intensity sufficient to overcome an elastic behavior of the map window. For example, one or more swipe gestures sufficient to overcome the elastic behavior of the map window may include, without limitation, various intensity characteristics, such as high velocity (i.e., high swipe speed), heavy force (i.e. heavy swipe pressure), etc., that indicate an amount of effort exerted by a user that is atypical when compared to an average (i.e., baseline) swipe gesture intensity. In the exemplary embodiment, stabilization program 110 determines the one or more swipe gestures does not exceed the escape velocity threshold where the one or more swipe gestures indicate a level of intensity insufficient to overcome an elastic behavior of the map window. For example, one or more swipe gestures insufficient to overcome the elastic behavior of the map window may include, without limitation, various intensity characteristics, such as average or low velocity (i.e., average or slow swipe speed), average or light force (i.e., average or light swipe pressure), etc., that indicate an amount of effort exerted by a user that is comparable to or below a baseline swipe gesture intensity.

In one embodiment, the escape velocity threshold, the level of intensity sufficient to overcome the elastic behavior of the map window, and the level of intensity insufficient to overcome the elastic behavior of the map window can be configurable, such that a user can adjust, for example, a level of velocity and a level of force that indicates a level of intensity sufficient to overcome the elastic behavior of the window.

Responsive to a determination that one or more swipe gestures that do not exceed the escape velocity threshold (NO branch, 408), stabilization program 110 progresses the map window on a map (412). In the exemplary embodiment, in response to receiving a directional swipe gesture that does not exceed the escape threshold, stabilization program 110 progresses the map window on a map into an area of the map where the route is missing (i.e., off route) temporarily (i.e., elastically), such that the map window returns to a location on the route once a user releases the directional swipe gesture. For example, where stabilization program 110 receives a left swipe gesture, stabilization program 110 temporarily (i.e., elastically) progresses the map window in a left direction, holding a fixed focus point on the route, such that when the user releases the left swipe gesture, the map window returns to the fixed focus point on the route.

In the exemplary embodiment, in response to receiving an up swipe gesture that does not exceed the escape velocity threshold, stabilization program 110 progresses the map window in a forward direction (i.e., a source location to a destination) along the route without skipping to a next logical milestone. In one embodiment, stabilization program 110 retains focus of the map window on the route, progressing a pointer towards a destination based, at least in part, on a level of intensity associated with the up swipe gestures (i.e., distance traveled by the pointer is proportional to the intensity of the up swipe gesture, such that a more intense up swipe gesture progresses the pointer further and faster along the route towards the destination than a less intense up swipe gesture).

In the exemplary embodiment, in response to receiving a down swipe gesture that does not exceed the escape velocity threshold, stabilization program 110 progresses the map window in a reverse direction along the route without skipping to a previous logical milestone. In one embodiment, stabilization program 110 retains focus of the map window on the route, progressing a pointer towards a source location based, at least in part, on a level of intensity associated with the down swipe gestures (i.e., distance traveled by the pointer is proportional to the intensity of the down swipe gesture, such that a more intense down swipe gesture progresses the pointer further and faster along the route towards the source location than a less intense down swipe gesture).

Responsive to a determination that the one or more swipe gestures exceed the escape velocity threshold (YES branch, 408), stabilization program 110 generates a custom peg in the map window (410). In the exemplary embodiment, stabilization program 110 generates a custom peg in the map window by capturing a snapshot of the last position on the route visible in the map window prior to exceeding the escape velocity threshold. In the exemplary embodiment, stabilization program 110 preserves the custom peg in the map window, such that the custom peg remains visible as a thin border within the visible area of the map whenever the route is lost from the map window, as discussed above with reference to FIG. 3. In the exemplary embodiment, stabilization program 110 preserves the custom peg in a border of the map window allowing the user to continue scrolling through areas of the map around the route, without losing the last visible section of the route.

In the exemplary embodiment, stabilization program 110 progresses the map window on a map (412). In one embodiment, in response to receiving one or more swipe gestures that exceeds the escape velocity threshold, stabilization program 110 progresses the map window on a map into an area of the map where the route is missing (i.e., off route), such that map window remains off route, until stabilization program 110 receives a custom peg selection. For example, where stabilization program 110 receives a left swipe gesture, stabilization program 110 progresses the map window in a left direction such that the map window remains in at a location on the map off route until a user selects a custom peg from the map window.

Figure 5:
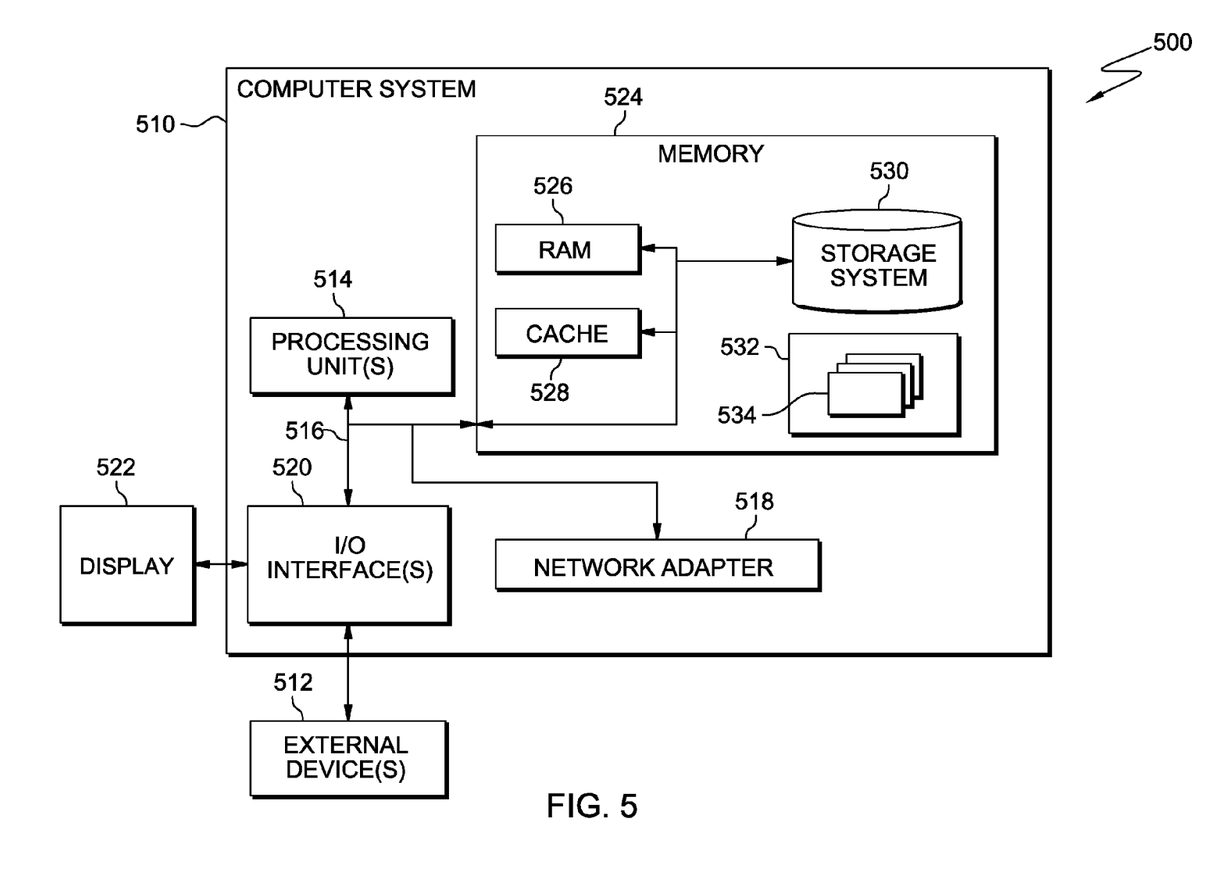
FIG. 5 is a block diagram depicting components of a data processing system (such as the server of FIG. 1), in accordance with an embodiment of the present invention.

FIG. 5 depicts a block diagram of components of data processing environment 100, such as server 104, in accordance with an illustrative embodiment of the present invention. It should be appreciated that FIG. 5 provides only an illustration of one implementation and does not imply any limitations with regard to the environments in that different embodiments may be implemented. Many modifications to the depicted environment may be made.

In the illustrative embodiment, computer system 510 in data processing environment 100 is shown in the form of a general-purpose computing device. The components of computer system 510 may include, but are not limited to, one or more processors or processing unit 514, memory 524, and bus 516 that couples various system components including memory 524 to processing unit 514.

Bus 516 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 510 typically includes a variety of computer system readable media. Such media may be any available media that is accessible by computer system 510, and it includes both volatile and non-volatile media, removable and non-removable media.

Memory 524 can include computer system readable media in the form of volatile memory, such as random access memory (RAM) 526 and/or cache memory 528. Computer system 510 may further include other removable/non-removable, volatile/non-volatile computer system storage media. By way of example only, storage system 530 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 516 by one or more data media interfaces. As will be further depicted and described below, memory 524 may include at least one computer program product having a set (e.g., at least one) of program modules that are configured to carry out the functions of embodiments of the invention.

Program/utility 532, having one or more sets of program modules 534, may be stored in memory 524 by way of example, and not limitation, as well as an operating system, one or more application programs, other program modules, and program data. Each of the operating systems, one or more application programs, other program modules, and program data, or some combination thereof, may include an implementation of a networking environment. Program modules 534 generally carry out the functions and/or methodologies of embodiments of the invention as described herein. Computer system 510 may also communicate with one or more external device(s) 512 such as a keyboard, a pointing device, a display 522, etc., or one or more devices that enable a user to interact with computer system 510 and any devices (e.g., network card, modem, etc.) that enable computer system 510 to communicate with one or more other computing devices. Such communication can occur via Input/Output (I/O) interface(s) 520. Still yet, computer system 510 can communicate with one or more networks such as a local area network (LAN), a general wide area network (WAN), and/or a public network (e.g., the Internet) via network adapter 518. As depicted, network adapter 518 communicates with the other components of computer system 510 via bus 516. It should be understood that although not shown, other hardware and software components, such as microcode, device drivers, redundant processing units, external disk drive arrays, RAID systems, tape drives, and data archival storage systems may be used in conjunction with computer system 510.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A non-transitory computer-readable storage medium having stored therein program instructions, that when executed by a computing device, cause the computing device to perform functions comprising:
    displaying a map window on a display screen of the computing device, wherein the map window includes a visible region of the map, the map including a plotted route originating at a source location and ending at a destination location and wherein the displaying includes displaying, by one or more computer processors, the map window with a route orientation, wherein the route orientation locates a destination location direction at a top of the map window and a source location direction at a bottom of the map window;
    receiving one or more directional swipe gestures from a user within the map window;
    responsive to receiving the one or more directional swipe gestures from the user, performing one of: displaying a progress of the user on the visible region of the map along the plotted in the map window, or, scrolling the map window in a direction corresponding to the one or more directional swipe gestures, wherein the scrolling the map window includes scrolling the map window off the plotted route based on a scroll elasticity of the map window, the scroll elasticity of the map window capable of returning the map window to a fixed focus point along the plotted route upon release of the one or more directional swipe gestures;
    determining whether the one or more directional swipe gestures exceeds an escape velocity threshold, wherein the escape velocity threshold is a level of swipe intensity to overcome an elastic behavior of the map window and to allow the map window to remain in an area of the map off the plotted route;
    responsive to the determination that the one or more directional swipe gestures exceeds the level of swipe intensity to progress the map window into the area of the map off the plotted route, generating one or more custom pegs, wherein the one or more custom pegs include one or more compressed snapshots of corresponding one or more last positions on the visible region within the map window along the plotted route prior to exceeding the escape velocity threshold, wherein the generating the one or more custom pegs includes:
        capturing the one or more compressed snapshots of the corresponding one or more last positions on the visible region within the map window along the plotted route on the map prior to exceeding the escape velocity threshold; and
        preserving the one or more custom pegs as the one or more compressed snapshots, which are located at a border at an opposite corner of the plotted route in the map window;
    allowing the user to continue scrolling through areas off the plotted route in the map window until at least one of the one or more custom pegs is selected by the user;
    receiving the at least one custom peg selection, wherein the at least one custom peg selection includes a tapping action of the user indicating a selection of at least one of the one or more custom pegs located at the border at the opposite corner of the plotted route in the map window; and
    responsive to receiving the at least one custom peg selection, automatically returning the map window to the corresponding one or more last positions on the visible region within the map window along the plotted route on the map prior to exceeding the escape velocity threshold.

* * * * *